No. 650,412. Patented May 29, 1900.
R. K. McLELLAN.
SHAFT COUPLING.
(Application filed Oct. 13, 1899.)
(No Model.)

WITNESSES:

INVENTOR
Robert K. McLellan.
BY
Daniel A. Carpenter,
ATTORNEY

UNITED STATES PATENT OFFICE.

ROBERT K. McLELLAN, OF NEW YORK, N. Y.

SHAFT-COUPLING.

SPECIFICATION forming part of Letters Patent No. 650,412, dated May 29, 1900.

Application filed October 13, 1899. Serial No. 733,488. (No model.)

*To all whom it may concern:*

Be it known that I, ROBERT K. MCLELLAN, a citizen of the United States, residing in the borough of Manhattan, in the city, county, and State of New York, have invented a certain new and useful Improvement in Shaft-Couplings, of which the following is a full, clear, and exact description, reference being made to the accompanying drawings, forming part of this specification.

This invention relates to improvements in shaft-couplings which comprise parts of a shaft overlapping and engaging with each other, as herein shown, a sleeve surrounding them, and means for locking them and the sleeve together; and the invention consists of a shaft-coupling having the structure which is herein described, and precisely defined in the claims.

Figure 1:
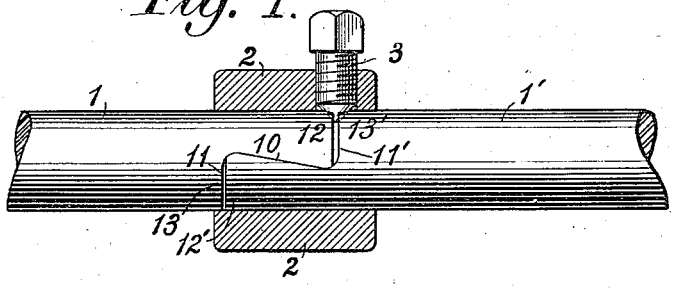
Figure 2:
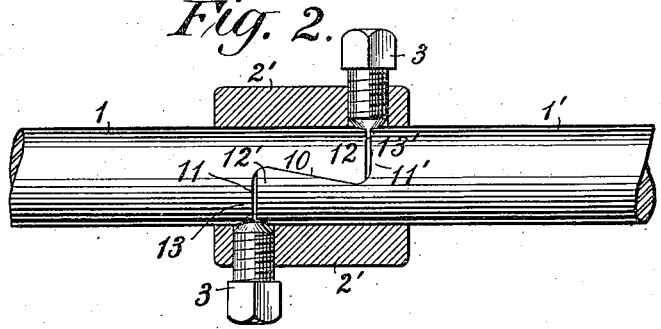
Figure 3:
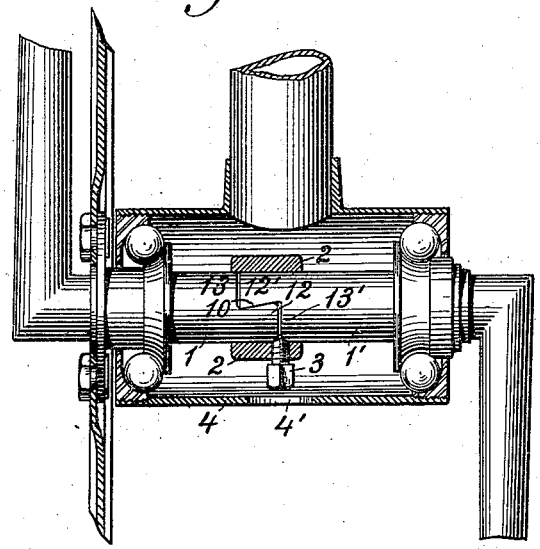

On the accompanying sheet of drawings, Figure 1 is a partly-sectional view showing the coupling in its simplest form; Fig. 2, a like view showing the coupling in another form; and Fig. 3, a longitudinal section of a crank-hanger of a bicycle, showing the interior thereof and the coupling applied to the crank-shaft.

Similar reference-numerals designate like parts in the different views.

The object of this invention is to produce an uncommonly simple as well as small and effective shaft-coupling, so constructed as to be made with but little labor and to render but little effort necessary to couple or uncouple the parts of a shaft to which it is applied.

The parts 1 and 1' of the shaft overlap and make contact with each other next to their adjacent ends, their surfaces of contact being so inclined to their common axis that the parts cannot be separated by moving either lengthwise without disturbing its alinement with the other. The preferred shape of their overlapping sections is that shown in the drawings. The part 1 is cut in two planes which intersect its surface on the lines 10 and 11, respectively, and the part 1' is cut in two planes which intersect its surface on the lines 10 and 11', respectively, and the parts are so arranged that the surfaces lying in the planes 10 meet, the end 12 and shoulder 13 facing, respectively, the shoulder 13' and the end 12'. The sleeve surrounding the overlapping sections may be the short sleeve shown in Fig. 1 or the longer sleeve shown in Fig. 2. In the short sleeve 2 is a screw 3, which has a conical or convex end and extends from the exterior to the interior of the sleeve and between the end 12 of the part 1 and the shoulder 13' of the part 1', as shown, or else between the end 12' of the part 1' and the shoulder 13 of the part 1. The end and shoulder between which the screw extends are beveled or grooved a little to provide good bearing-surfaces for the screw. When the screw is driven tightly between the parts 1 and 1', it moves one or both of them slightly and forces the overlapping sections against each other, and each section, acting as a wedge, presses the other firmly against the inner surface of the sleeve. The coupling is unfastened by withdrawing the screw from between the parts of the shaft and tapping one end of the shaft with a hammer. In the longer sleeve 2' there are two screws 3, each of which extends between the parts 1 and 1' of the shaft, as does the screw in the sleeve 2, and both of which coact with the sleeve in locking the parts of the coupling together by forcing the overlapping sections against each other and causing each section to wedge the other against the inner surface of the sleeve. It is intended to apply couplings of the form shown in Fig. 1 mainly to small shafts and those of the form shown in Fig. 2 mainly to large shafts.

When the coupling is applied to the crank-shaft 1 1' of a bicycle, a hole is made in the crank-hanger 4 to afford access to the coupling, the hole 4' being of such size and so located as to allow the screw 3 to be turned by a key extending through the hole.

Having thus described my invention, what I claim as new, and desire to secure by Letters Patent, is—

1. A shaft-coupling comprising the combination of: parts of a shaft having overlapping wedge-like sections making contact with and extending back of one another; a sleeve closely surrounding said sections; and a locking device attached to the sleeve and extending between the parts of the shaft; substantially as described.

2. A shaft-coupling comprising the combination of: parts of a shaft having overlapping wedge-like sections making contact with and extending back of one another; a sleeve closely surrounding said sections; and a locking device consisting of a screw extending from the exterior to the interior of the sleeve and engaging with the sleeve and exerting pressure on the parts of the shaft; substantially as described.

3. A shaft-coupling comprising the combination of: parts 1 and 1' of a shaft having overlapping wedge-like sections making contact with and extending back of one another, the part 1 having the end 12 and shoulder 13, and the part 1' having the end 12' and shoulder 13'; a sleeve closely surrounding said sections; and a screw extending from the exterior to the interior of the sleeve and engaging with the sleeve and extending between one of said ends and the shoulder facing that end; substantially as described.

4. A shaft-coupling comprising the combination of: parts 1 and 1' of a shaft having overlapping wedge-like sections making contact with and extending back of one another, the part 1 having the end 12 and shoulder 13, and the part 1' having the end 12' and shoulder 13'; a sleeve closely surrounding said sections; and screws extending from the exterior to the interior of the sleeve and engaging with the sleeve, and one of said screws extending between the end 12 and shoulder 13' and the other between the end 12' and shoulder 13; substantially as described.

ROBERT K. McLELLAN.

In presence of—
C. C. MILLER,
WM. J. HANDOVER.